US012658466B2

(12) United States Patent
Zhang et al.

(10) Patent No.: US 12,658,466 B2
(45) Date of Patent: Jun. 16, 2026

(54) JELLY ROLL AND BATTERY

(71) Applicant: ZHUHAI COSMX BATTERY CO., LTD., Zhuhai (CN)

(72) Inventors: Baohai Zhang, Zhuhai (CN); Bin Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/183,637

(22) Filed: Apr. 18, 2025

(65) Prior Publication Data

US 2026/0155424 A1 Jun. 4, 2026

(30) Foreign Application Priority Data

Nov. 29, 2024 (CN) .......................... 202411732187.4

(51) Int. Cl.
| | |
|---|---|
| *H01M 4/48* | (2010.01) |
| *H01M 4/36* | (2006.01) |
| *H01M 4/587* | (2010.01) |
| *H01M 10/04* | (2006.01) |

(52) U.S. Cl.
CPC ....... *H01M 10/0431* (2013.01); *H01M 4/366* (2013.01); *H01M 4/48* (2013.01); *H01M 4/587* (2013.01)

(58) Field of Classification Search
None
See application file for complete search history.

(56) References Cited

U.S. PATENT DOCUMENTS

2021/0234196 A1* 7/2021 Peng ................. H01M 10/0568

FOREIGN PATENT DOCUMENTS

| | | | |
|---|---|---|---|
| CN | 103000936 A | | 3/2013 |
| CN | 107017432 A | | 8/2017 |
| CN | 219435902 U | * | 7/2023 |
| CN | 219716919 U | | 9/2023 |
| CN | 116526083 B | | 3/2024 |
| CN | 117637990 B | | 4/2024 |

(Continued)

OTHER PUBLICATIONS

The First Office Action dated Jan. 4, 2025 for Application No. 202411732187.4.

(Continued)

*Primary Examiner* — Zhongqing Wei

(57) ABSTRACT

A jelly roll includes: a negative electrode sheet and a positive electrode sheet, where along a first direction, the negative electrode sheet includes a negative electrode current collector having a first surface being provided with a first coating layer and a second surface being provided with a second coating layer; the first coating layer is provided with multiple grooves, and centers of two adjacent grooves are spaced apart by a first distance; the positive electrode sheet is provided with multiple convex parts and concave parts corresponding to the convex parts, and a surface on which the convex parts of the positive electrode sheet are located is opposite to a surface on which the grooves of the negative electrode sheet are located; and along a width direction of the grooves, a size of projections of the convex parts on the negative electrode sheet is greater than the first distance.

17 Claims, 11 Drawing Sheets

(56) References Cited

FOREIGN PATENT DOCUMENTS

| JP | 4179778 B2 | 11/2008 |
| JP | 2022-125780 A | 8/2022 |

OTHER PUBLICATIONS

Notice of Examination Opinion on Request for Rapid Prequalification of Patent Application dated Nov. 21, 2024 for Pre-trial Case No. YS02820241002308.

Notification to Grant Patent Right for Invention dated Jun. 2, 2025 for Chinese Application No. 202411732187.4.

The Extended European Search Report for European Patent Application No. 25172069.4, dated Oct. 30, 2025.

* cited by examiner

| Type | Thickness of Straight Section H1 (Unit mm) | Thickness of Corner Sections H2 (Unit mm) | H1/(H2/2) |
|---|---|---|---|
| Jelly Roll 1 | 20 | 11 | 1.1 |
| Jelly Roll 2 | 25 | 14 | 1.12 |
| Jelly Roll 3 | 30 | 17 | 1.13 |
| Jelly Roll 4 | 35 | 19 | 1.08 |
| Jelly Roll 5 | 40 | 25 | 1.25 |
| Jelly Roll 6 | 45 | 27 | 1.2 |
| Jelly Roll 7 | 50 | 30 | 1.2 |
| Jelly Roll 8 | 55 | 40 | 1.45 |
| Jelly Roll 9 | 60 | 45 | 1.5 |
| Jelly Roll 10 | 70 | 45 | 1.29 |

FIG. 14

| Type | First Width R1 (Unit mm) | First Distance S (Unit mm) | R1/S |
|---|---|---|---|
| Jelly Roll 1 | 0.3 | 0.28 | 1.07 |
| Jelly Roll 2 | 1 | 0.9 | 1.1 |
| Jelly Roll 3 | 2 | 0.6 | 3.3 |
| Jelly Roll 4 | 3 | 1 | 3 |
| Jelly Roll 5 | 4 | 0.5 | 8 |
| Jelly Roll 6 | 4 | 2 | 2 |
| Jelly Roll 7 | 5 | 3 | 1.67 |
| Jelly Roll 8 | 6 | 4 | 1.5 |
| Jelly Roll 9 | 7 | 0.9 | 7.8 |
| Jelly Roll 10 | 8 | 5 | 1.6 |

FIG. 15

| Circle Layer of Jelly Roll | Vertical Distance(Unit μm) |
|---|---|
| Innermost Circle | 80 |
| First Intermediate Circle | 75 |
| Second Intermediate Circle | 70 |
| Third Intermediate Circle | 65 |
| Fourth Intermediate Circle | 60 |
| Fifth Intermediate Circle | 55 |
| Sixth Intermediate Circle | 50 |
| Seventh Intermediate Circle | 45 |
| Eighth Intermediate Circle | 40 |
| Outermost Circle | 3 |

FIG. 16

| Type | First Width R1 (Unit mm) | Groove Width M (Unit mm) | R1/M |
|---|---|---|---|
| Jelly Roll 1 | 0.5 | 0.0625 | 8 |
| Jelly Roll 2 | 1 | 0.025 | 40 |
| Jelly Roll 3 | 2 | 0.2 | 10 |
| Jelly Roll 4 | 3 | 0.15 | 20 |
| Jelly Roll 5 | 4 | 0.133 | 30 |
| Jelly Roll 6 | 5 | 0.167 | 30 |
| Jelly Roll 7 | 6 | 0.3 | 20 |
| Jelly Roll 8 | 7 | 0.35 | 20 |
| Jelly Roll 9 | 8 | 0.16 | 50 |
| Jelly Roll 10 | 8 | 0.2 | 40 |

FIG. 17

JELLY ROLL AND BATTERY

CROSS-REFERENCE TO RELATED APPLICATIONS

This application claims priority to Chinese Patent Application No. 202411732187.4, filed on Nov. 29, 2024, which is hereby incorporated by reference in its entirety.

TECHNICAL FIELD

The present application relates to the technical field of lithium electronic batteries, and in particular, to a jelly roll and a battery.

BACKGROUND

With rapid development of lithium-ion battery technology, there is higher requirements for lithium-ion battery energy density, cycle life and safety performance.

During a process of charging and discharging of lithium-ion battery, the negative electrode sheet will expand, resulting in interlayer extrusion of the electrode sheets; especially for wound lithium-ion battery formed by winding, an arc area of the wound structure thereof has a large stress accumulation, and the arc area itself has extrusion between the electrode sheets; in addition, the negative electrode sheet will expand during the process of charging and discharging, and the extrusion of the electrode sheets will be exacerbated; at the same time, this extrusion will also be transmitted from the arc area to a straight section. This kind of interlayer extrusion will eventually lead to insufficient electrolyte and poor infiltration between the layers, deterioration of interface, and even lithium precipitation of the negative electrode sheet, and thereby affecting the safety of a cell.

SUMMARY

In view of the above problems, embodiments of the present application provide a jelly roll and a battery to solve the problems of insufficient electrolyte and poor electrolyte infiltration caused by interlayer extrusion of the electrode sheets of the jelly roll in the related technology.

In order to achieve the above object, embodiments of the present application provide following technical solutions.

An embodiment of the present application provides a jelly roll including: a negative electrode sheet and a positive electrode sheet, both of which are laminated, where the positive electrode sheet is provided with a plurality of convex parts and concave parts provided corresponding to the convex parts.

By providing the positive electrode sheet with the convex parts and the concave parts corresponding to the convex parts, the convex parts provide support for contact with a separator, and increase micro-spacings between the electrode sheet and the separator, and these micro-spacings form a space that can accommodate an electrolyte, which makes the electrolyte have a sufficient infiltration amount into the electrode sheet, and avoids occurrence of abnormal situations such as insufficient electrolyte between the electrode sheets and the separator caused by the interlayer extrusion of the electrode sheets, poor infiltration, or even lithium precipitation of the negative electrode sheet.

The negative electrode sheet includes a negative electrode current collector, the negative electrode current collector has a first surface and a second surface provided opposite to each other along a first direction, the first surface is provided with a first coating layer, and the second surface is provided with a second coating layer; the first coating layer is provided with a plurality of grooves, and a surface of the positive electrode sheet where the convex parts are located and a surface of the negative electrode sheet where the grooves are located are provided opposite to each other.

The negative electrode sheet are provided with grooves opposite to the convex parts, and the grooves on the negative electrode sheet can effectively strengthen the infiltration of the electrolyte on the negative electrode sheet; furthermore, the surface of the positive electrode sheet where the convex parts are located and the surface of the negative electrode sheet where the grooves are located are provided opposite to each other, and thus provide an expansion space for the expansion of the negative electrode sheet, thereby mitigating extrusion and deformation of the convex parts of the positive electrode or deformation of the grooves of the negative electrode caused by expansion of the negative electrode sheet during a process of hot-pressing formation or charging and discharging of the battery, and guaranteeing structural strength of the convex parts and the grooves, as well as an interface bonding strength between the electrode sheet and the separator to stably play a support role for the separator, and at the same time, sufficient expansion space can also prevent the negative electrode sheet from extruding the separator during an expansion process and consequent deformation of the separator.

Centers of two adjacent grooves are spaced apart by a first distance; and along a width direction of the grooves, a size of a vertical projection of the convex part on the negative electrode sheet is greater than the first distance.

While the convex parts of the positive electrode and the grooves of the negative electrode are provided opposite to each other, a size of a projection of the convex parts of the positive electrode on the negative electrode sheet is greater than a center spacing of the grooves of the negative electrode, which prevents the convex parts of the positive electrode from being embedded in the grooves of the negative electrode, and facilitates a formation of a SEI film on the convex parts of the positive electrode, thereby forming an effective protection of the convex parts of the positive electrode, and preventing a problem of decreased structural stability of active materials of the positive electrode and accelerated decay of a battery capacity due to breakage of active particles of the convex parts of the positive electrode or even cobalt precipitation.

In one embodiment of the present application, the first surface and the second surface of the negative electrode sheet each are provided with a plurality of the grooves, the convex parts and the grooves are provided opposite to each other, and the concave part and the grooves are provided opposite to each other.

The negative electrode sheet are provided with grooves on both surfaces thereof, so that the concave parts of the positive electrode are also provided opposite to the grooves of the negative electrode while the convex parts of the positive electrode and the grooves of the negative electrode are provided opposite to each other; the concave parts of the positive electrode and the grooves of the negative electrode being provided opposite to each other may increase a space between the positive electrode sheet and the negative electrode sheet, to provide a large space for infiltration of the electrolyte, and thus to increase an amount of the stored electrolyte.

In one embodiment of the present application, along the width direction of the grooves, a size of a vertical projection of the convex part in a thickness direction of the negative electrode sheet is R1, and the first distance is S, with R1/S=1.02~8.

In the above ratio range, it is possible to mitigate the extrusion and deformation of the convex parts of the positive electrode or deformation of the grooves of the negative electrode caused by expansion of the negative electrode sheet during a process of hot-pressing formation or charging and discharging of the battery. If it is lower than the above ratio range, it indicates that a groove width corresponding to the first distance is larger, and when the expansion of the negative electrode sheet results in the interlayer extrusion of the electrode sheets, the convex parts of the positive electrode are easy to be embedded in the grooves of the negative electrode, which is easy to cause damage to the SEI film of the convex parts of the positive electrode, leaving the convex parts of the positive electrode unprotected; and if the ratio is greater than the above range, it indicates that the groove width corresponding to the first distance is small, and the setting of the first distance will be meaningless, and the grooves will not be able to provide an expansion space for the expansion of the negative electrode sheet, and at the same time, it is easy to lead to extrusion and deformation of the convex parts of the positive electrode or deformation of the grooves of the negative electrode caused by expansion of the negative electrode sheet during the process of hot-pressing formation or charging and discharging of the battery.

In one embodiment of the present application, along the width direction of the grooves, size of the vertical projection of the convex part in the thickness direction of the negative electrode sheet is R1, and a groove width of the groove is M, with R1/M=8~50.

In the above ratio range, it is possible to mitigate the extrusion and deformation of the convex parts of the positive electrode or deformation of the grooves of the negative electrode caused by expansion of the negative electrode sheet during the process of hot-pressing formation or charging and discharging of the battery. If it is lower than the above ratio range, it indicates that the groove width of the groove is larger, and when the expansion of the negative electrode sheet results in the interlayer extrusion of the electrode sheets, the convex parts of the positive electrode are easy to be embedded in the grooves of the negative electrode, which is easy to cause damage to the SEI film of the convex parts of the positive electrode, leaving the convex parts of the positive electrode unprotected; if it is greater than the above ratio range, it indicates that the groove width of the groove is small, the setting of the groove will be meaningless, and it is difficult for the grooves to store sufficient electrolyte and the grooves will not be able to provide an expansion space for the expansion of the negative electrode sheet, and also will not be able to mitigate the extrusion and deformation of the convex parts of the positive electrode or deformation of the grooves of the negative electrode caused by expansion of the negative electrode sheet during the process of hot-pressing formation or charging and discharging of the battery.

In one embodiment of the present application, the first coating layer and/or second coating layer includes a silicon-carbon composite material and/or a silicone-oxygen composite material, and a mass proportion of the silicon-carbon composite material and/or silicone-oxygen composite material in the first coating layer and/or second coating layer is less than or equal to 50 wt %.

In one embodiment of the present application, the positive electrode sheet includes a positive electrode current collector, the positive electrode current collector has a third surface and a fourth surface provided opposite to each other along the first direction, the third surface is provided with a third coating layer and the fourth surface is provided with a fourth coating layer; the negative electrode sheet and the positive electrode sheet are wound around a first central plane, a surface of the positive electrode current collector facing the first central plane is the third surface, and a surface of the positive electrode current collector away from the first central plane is the fourth surface; the third surface and the first surface are provided opposite to each other, and the fourth surface and the second surface are provided opposite to each other; the jelly roll includes a straight section and corner sections located at two opposite ends of the straight section; the convex parts are protruded from the third coating layer to the fourth coating layer.

Due to a curvature of the corner section, the first surface of the silicon-doped negative electrode sheet is subjected to a greater extrusion force than the second surface of the silicon-doped negative electrode sheet, and in the event of an expansion of the silicon-doped negative electrode sheet as a whole, the degree of expansion of the second surface is greater than the degree of expansion of the first surface, which may easily result in cracks appearing on the second surface of the negative electrode sheet; the grooves of the first surface of the negative electrode are provided opposite to the third surface of the positive electrode, i.e., grooves of the second surface of the negative electrode and the third surface of the positive electrode are provided opposite to each other, and when the second surface of the negative electrode expands severely, a part of the coating layer of the second surface can enter into the concave parts of the positive electrode, releasing the stress of the expansion of the negative electrode, so as not to affect the depth of the convex parts of the positive electrode, and to ensure a normal support function of the convex parts of the positive electrode;

in addition, due to the curvature of the corner section, when an arc of an outer side of the positive electrode sheet wraps the negative electrode sheet, a circumference of an arc of the third coating layer on the third surface of an inner side of the positive electrode sheet is greater than a circumference of the first surface of the negative electrode sheet in the corner section, resulting in a decrease of a ratio of a negative electrode surface capacity to a positive electrode surface capacity in this area, and a risk of lithium precipitation. In an embodiment of the present application, by the convex parts protruding from the third coating layer to the fourth coating layer, and the grooves of the first surface of the negative electrode and the concave parts of the third surface of the positive electrode being provided opposite to each other, a migration path of a positive electrode active material in the concave parts is longer, and migration paths of the positive electrode active material in other parts are shorter, which in turn reduces the positive electrode active material in the concave parts participating in the charging and discharging reaction, so that the coating layer of the negative electrode on the third surface has sufficient sites for de-embedding lithium ions, which enhances a CB value (negative electrode surface capacity/positive electrode surface capacity) in the area, and reduces the probability of lithium precipitation in the area.

In one embodiment of the present application, a sum of projected areas of the plurality of the convex parts on the negative electrode sheet is 60%~90% of an area of the fourth coating layer; the jelly roll further includes an electrolyte doped with 1,4-dicyano-2-butene, a content of the 1,4-dicyano-2-butene in the electrolyte being 0.05%~3%.

Defining the proportion of areas of the convex parts of the positive electrode on the coating layer can ensure a support effect of the convex parts of the positive electrode; at the same time, electrolyte infiltrated between the positive electrode sheet and the negative electrode sheet is further doped with a certain amount of 1,4-dicyano-2-butene, and the 1,4-dicyano-2-butene can play a protective role for edges of the convex parts of the positive electrode and strengthen the edges of the convex parts, preventing the problem of decreased structural stability of active materials of the positive electrode, and accelerated decay of the battery capacity due to breakage of the active particles of the convex parts of the positive electrode cracking or even cobalt precipitation.

In one embodiment of the present application, a shape of a vertical projection of the convex parts on the negative electrode sheet includes a circle, a semicircle, an oval, a plum blossom shape, a polygonal shape, a diamond shape, a capsule shape, or an island shape, and the like.

In one embodiment of the present application, the positive electrode sheet includes an upper surface and a lower surface provided opposite to each other, and the convex parts are formed by protruding outward from the upper surface of the positive electrode sheet; the convex parts include a protruding part and a root part connecting the protruding part with the upper surface; the protruding part has an arc-shaped surface, and/or the protruding part is connected to the upper surface through an arc-shaped edge surface, and edges of the convex parts having a polygonal shape, a diamond shape, or an island shape are an arc edge.

It is avoided the convex parts have a sharp edge to prevent particles from falling off at the edge of the convex parts during the processing; at the same time, it is avoided that the edges or tops of the convex parts pierce a coating of the positive electrode, to prevent the coating from cracking and causing falling off of powders, the powders fallen off easily dropping onto the negative electrode sheet, thereby leading to the risk of short-circuiting and fire; furthermore, it may be prevented that the tops of the convex parts pierce the separator and contact with the negative electrode sheet, leading to short-circuiting.

In one embodiment of the present application, a line connected between the root part and a vertex of the protruding part is a first connecting line, an angle between the first connecting line and the upper surface is a first angle, and the first angle is 3°~45°.

By defining the angle between the first connecting line and the upper surface, it is ensured that the convex parts of the positive electrode have a suitable slope, so that the convex parts of the positive electrode can play a supporting role between the positive electrode sheet and the negative electrode sheet, and at the same time, it can prevent the convex parts of the positive electrode from being too sharp and piercing the separator. When the first angle is less than 3°, the convex parts are too small to play a supporting role between the positive electrode sheet and the negative electrode sheet; when the first angle is greater than 45°, the convex parts have a too high slope, which will cause the problem of a protruding tip, and the protruding tip easily pierces the separator to cause a safety problem.

In one embodiment of the present application, the corner section has a first thickness H1 and the straight section has a second thickness H2, the first thickness H1 and the second thickness H2 having a following relationship: H1/(H2/2)= 1.05~1.5.

Due to the structural characteristics of the corner section and stress accumulation, outward expansion of the corner section is restricted, which ultimately leads to the problem of lithium precipitation caused by the interlayer extrusion of the electrode sheets; the embodiment of the present application achieves the above thickness relationship by providing convex parts and concave parts corresponding to the convex parts on the positive electrode sheet, and providing grooves directly facing the convex parts on the negative electrode sheet, the setting of the above thickness relationship may effectively improve the lithium precipitation problem in the corner section and at the same time, ensure that thicknesses of the convex parts and the grooves in the corner section and the straight section are matched, so that an interlayer interaction force of the cell is appropriate, ensuring that protrusions of the positive electrode sheet and grooves of the negative electrode will not be deformed in the process of charging and discharging.

In one embodiment of the present application, along the width direction of the grooves, a size of vertical projection of the convex parts on the negative electrode sheet is R1=0.3 mm~8 mm; and/or a center spacing of projections of two adjacent convex parts on the negative electrode sheet is D1=1 mm~6 mm; and/or there is a vertical distance between the root part and a vertex of the protruding part in the first direction, the vertical distance being H3=3 μm~80 μm.

Ensuring the size of the vertical projections of the convex parts on the negative electrode sheet being within the above range may avoid a tip effect caused by a small size of the convex parts, to prevent the separator from being punctured; and avoid a large span of the protruding surface of the convex parts caused by a large size of the convex parts, to prevent affecting the supporting effect of the convex parts. Ensuring that the center spacing of the convex parts is within the above range may avoid overlapping or too high density of the convex parts caused by a too small center spacing of the convex parts to prevent that the roller pressure is too large when forming the convex parts and if the convex parts are too dense, an interlayer stress of the cell is difficult to be released during the process of charging and discharging, which easily leads to falling off of particles from the electrode sheet; and may avoid a large span between protruding surfaces of two adjacent convex parts caused by too large center spacing of the convex parts to prevent affecting the support effect of the convex parts. Ensuring that the height of the convex parts is within the above range may avoid a situation in which a support effect is poor and cannot provide sufficient infiltration space of the electrolyte due to too small convex parts; and avoid a situation in which serious delamination occurs between the positive electrode sheet and the negative electrode sheet due to too large convex parts, which will lead to new interface issues.

In one embodiment of the present application, in the corner section, a vertical distance from vertexes of the convex parts of an innermost circle of the jelly roll to the root parts of the convex parts is a first vertical distance, a vertical distance from vertexes of the convex part of an outermost circle of the jelly roll to the root parts of the convex parts is a second vertical distance, and the first vertical distance is greater than the second vertical distance.

The extrusion of the corner section mainly occurs in layers of the jelly roll near an inner circle, the closer to an outer circle, the smaller the extrusion force, the less likely the electrolyte is to be deficient, and the lower the risk of lithium precipitation; the vertical distance of the convex parts of the innermost circle of the jelly roll being greater than the vertical distance of the convex parts of the outermost circle of the jelly roll may increase an amount of electrolyte retained in the innermost circle of the jelly roll, to ensure that lithium precipitation will not occur in the inner circle of the cell, and so on; furthermore, the corner section of the inner circle having smaller convex parts can reduce a width of the corner section, thereby improving the problem of over-width of the cell and improving the energy density of the cell.

In one embodiment of the present application, the groove width is M=30 μm~170 μm; and/or in the first direction, the groove has a groove depth, the groove depth being T=10 μm~60 μm; and/or the first distance is S=0.5 mm~3 mm.

Ensuring that the groove width of the grooves is within the above range may avoid that due to too small groove width, the grooves are unable to provide an expansion space for expansion of the negative electrode sheet, and is unable to mitigate the extrusion and deformation of the convex parts of the positive electrode or deformation of the grooves of the negative electrode caused by the expansion of the negative electrode sheet during the process of hot-pressing formation or charging and discharging of the battery; and at the same time, may avoid the problem that the convex parts of the positive electrode is easily embedded in the grooves of the negative electrode when the expansion of the negative electrode sheet caused by an excessive width of the grooves results in the interlayer extrusion of the electrode sheets. Ensuring that the groove depth of the grooves is within the above range may avoid the situation where too small groove depth fails to have an effect of mitigating the deformation of the convex parts caused by the expansion of the electrode sheet during the process of charging and discharging, too small groove depth also reducing storage capacity of the electrolyte; and at the same time, may avoid the problem that the negative electrode sheet is easily to be broken in an area of the grooves due to too large groove depth. Ensuring that the center spacing of the grooves is within the above range may enable the grooves on the negative electrode sheet to have a suitable density.

In one embodiment of the present application, the projection of each of the convex parts on the negative electrode sheet has a center point, and some of the center points are distributed on a second connecting line; a projection of the grooves on the negative electrode current collector is a rectangular surface, and the second connecting line is parallel to or intersects with the rectangular surface; when the second connecting line intersects with the rectangular surface, an angle between the second connecting line and the rectangular surface is 0°~45°.

When the second connecting line is parallel to the rectangular surface, the plurality of convex parts located on the second connecting line can each be opposite to one groove, which makes the processing of the convex parts and the grooves more convenient; when the second connecting line intersects with the rectangular surface, the plurality of convex parts located on the second connecting line are each opposite to a different groove, and at the same time, by defining the angle between the second connecting line and the rectangular surface in the above mentioned range, it may be ensured that each convex part on the second connecting line may be opposite to a corresponding groove.

An embodiment of the present application further provides a battery including the jelly roll as described above.

BRIEF DESCRIPTION OF DRAWINGS

In order to more clearly illustrate technical solutions in the embodiments of the present application or prior art, the following will be a brief introduction to accompanying drawings that need to be used in the description of the embodiments or prior art, and it will be obvious that the accompanying drawings in following description are some of the embodiments of the present application, and for those skilled in the field, other drawings may be obtained from these accompanying drawings without creative labor.

FIG. 14 shows thickness data of a straight section and a corner section of 10 types of jelly rolls provided in an embodiment of the present application.

FIG. 15 shows specific values of a first width and a first distance of 10 types of jelly rolls provided in an embodiment of the present application.

FIG. 16 shows vertical distances of circles in a jelly roll provided in an embodiment of the present application.

FIG. 17 shows specific values of a first width and a groove width of 10 types of jelly rolls provided in an embodiment of the present application.

REFERENCE SIGNS

100: negative electrode sheet;

101: negative electrode current collector; 102: first coating layer; 103: second coating layer; 110: groove;

1011: first surface; 1012: second surface; S2: a surface on which the grooves of the negative electrode sheet are located;

200: positive electrode sheet;

201: positive electrode current collector; 202: third coating layer; 203: fourth coating layer; 210: convex part; 2101: protruding part; 2102: root part; 2103: convex part of an innermost circle of the jelly roll; 2104: convex part of an outermost circle of the jelly roll; 2105: a vertex of the protruding part; 211: concave part; A1: vertical projection of a convex part in a first direction; A2: vertical projection of a concave part in a first direction; R1: size of a vertical projection of a convex part in a thickness direction of the negative electrode sheet; H3: vertical distance; H31: first vertical distance; H32: second vertical distance;

2011: third surface; 2012: fourth surface; S1: a surface on which the convex parts of the positive electrode sheet are located;

301: first connecting line; 302: first horizontal plane;

401: rectangular; 402: second connecting line;

501: first central plane.

DESCRIPTION OF EMBODIMENTS

Figure 1:
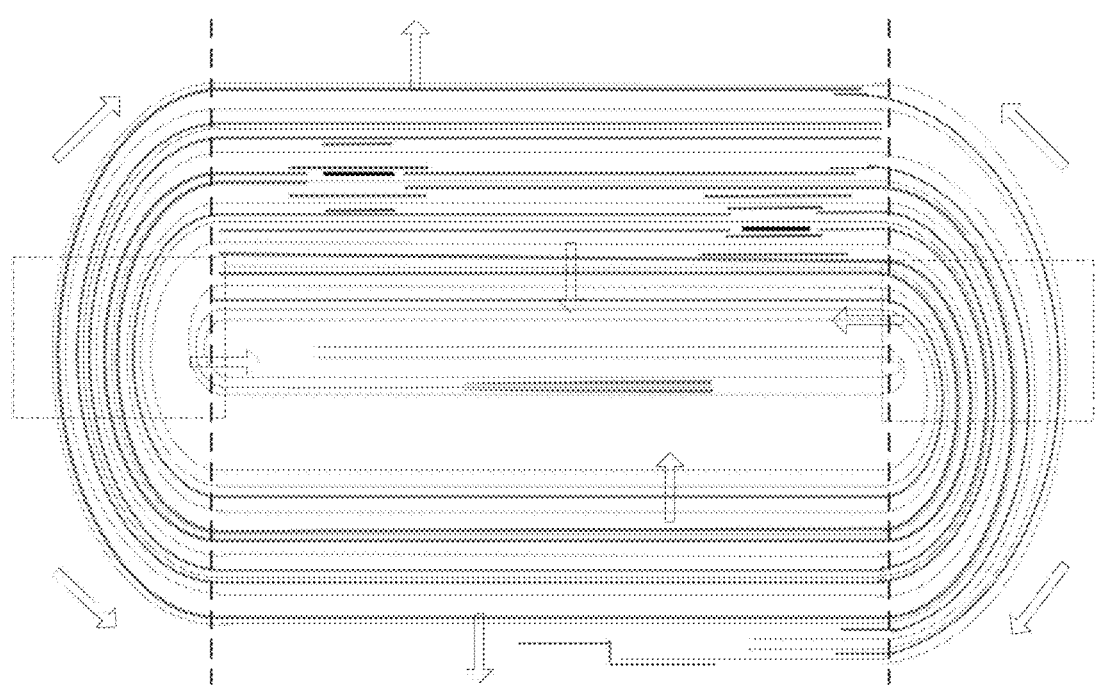
FIG. 1 is a schematic structural diagram of a jelly roll provided in the related technology.

The structure of a jelly roll of a wound lithium-ion battery in the related technology is shown in FIG. 1, where electrode assembly is laminated and wound to form a wound structure of the cell, a cross-section of the wound structure shows a flat elliptical structure, two sides of the elliptical structure are arc areas, and a middle of the elliptical structure is a plane area; in the figure, areas surrounded by the dotted lines in the arc areas is an area where stress is concentrated, and directions pointed out by arrows are expansion directions of the positive electrode sheet and the negative electrode sheet when they expanding; the positive electrode sheet and the negative electrode sheet of the lithium-ion battery will expand in the process of charging and discharging, the plane area can be free to expand upward and downward, but outward expansion of the arc area is bound due to structural characteristics and the stress accumulation of the arc area.

At the same time, an extrusion of the arc area will also be transferred to the plane area, and because the plane area has experienced an extrusion during the hot-pressing process in production, the plane area is pressed very tightly, which leads to poor electrolyte infiltration in the plane area as well.

Eventually, the interlayer extrusion of the electrode sheets leads to poor infiltration of electrolyte, which results in a low retention of electrolyte between the layers of the electrode sheet, which indicates that a transmission channel of lithium ions is lost in the area, making that the lithium ions of the positive electrode sheet are unable to be de-intercalated, and the number of the lithium ions intercalated at corresponding positions of the negative electrode sheet is insufficient, which results in that a purple spot appears, and in the end, lithium ions of the negative electrode sheet are unable to be returned to the positive electrode sheet, and are finally deposited on the surface of the negative electrode sheet, i.e., lithium precipitation. In addition, during a cycling process, due to a large expansion of the negative electrode sheet, it is easy to press against the separators on both sides in contact with the negative electrode sheet, resulting in the extrusion and deformation of the separator, which causes micropores of the separator to be blocked, and further increases the risk of lithium precipitation in the area.

In the jelly roll provided in embodiments of the present application, by providing the convex parts and the concave parts corresponding to the convex parts on the positive electrode sheet, the convex parts provide support for contacting with a separator, and increase micro-spacings between the electrode sheet and the separator, and these micro-spacings form a space that can accommodate the electrolyte, which makes the electrolyte have a sufficient infiltration amount into the electrode sheet, and avoids occurrence of abnormal situations such as insufficient electrolyte between the electrode sheets and the separator caused by the interlayer extrusion of the electrode sheets, poor infiltration, or even lithium precipitation of the negative electrode sheet.

Meanwhile, the negative electrode sheet are provided with grooves opposite to the convex parts, and the grooves on the negative electrode sheet can effectively strengthen the infiltration of the negative electrode sheet by the electrolyte; furthermore, the surface S1 on which the convex parts of the positive electrode sheet are located and the surface S2 on which the grooves of the negative electrode sheet are located are provided opposite to each other, to provide an expansion space for the expansion of the negative electrode sheet, thereby mitigating extrusion and deformation of the convex parts of the positive electrode or deformation of the grooves of the negative electrode caused by expansion of the negative electrode sheet during a process of hot-pressing formation or charging and discharging of the battery and ensuring structural strength of the convex parts and the grooves, as well as an interface bonding strength between the electrode sheet and the separator, to stably play a support role for the separator, and at the same time, sufficient expansion space can also prevent the negative electrode sheet from extruding the separator during an expansion process and consequent deformation of the separator.

Further, it is defined that a size of a vertical projection of the convex parts in the thickness direction of the negative electrode sheet is greater than a center spacing of the two adjacent grooves, which prevents the convex parts of the positive electrode from being embedded in the grooves of the negative electrode, facilitates a formation of a SEI film on the convex parts of the positive electrode, thereby forming an effective protection for the convex parts of the positive electrode, and preventing a problem of decreased structural stability of active materials of the positive electrode and accelerated decay of a battery capacity due to breakage of active particles of the convex parts of the positive electrode or even cobalt precipitation.

In order to make the above objects, features and advantages of the embodiments of the present application more obvious and understandable, the technical solutions in the embodiments of the present application will be described clearly and completely in the following in combination with the accompanying drawings of the embodiments of the present application. Obviously, the described embodiments are only some of the embodiments of the present application, and not all of the embodiments. Based on the embodiments in the present application, all other embodiments obtained by those skilled in the field without creative labor fall within the scope of protection of the present application.

Figure 2:
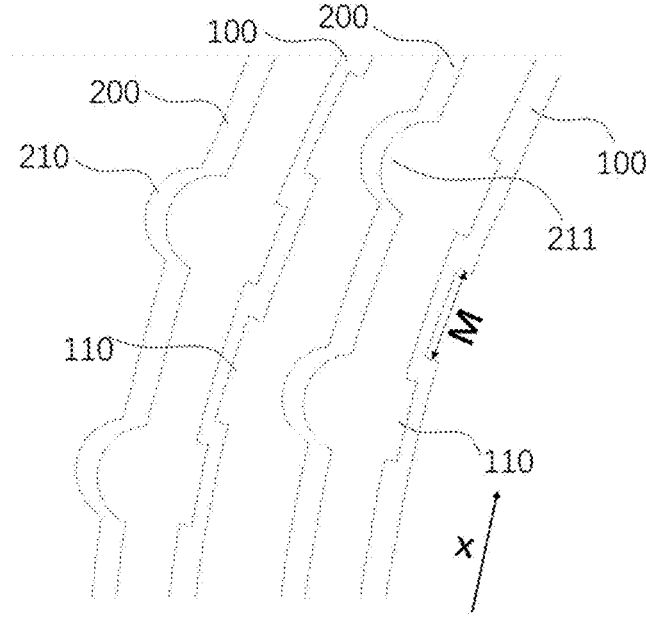
FIG. 2 is a schematic structural diagram I of a negative electrode sheet and a positive electrode sheet of a jelly roll provided in an embodiment of the present application.
Figure 2A:
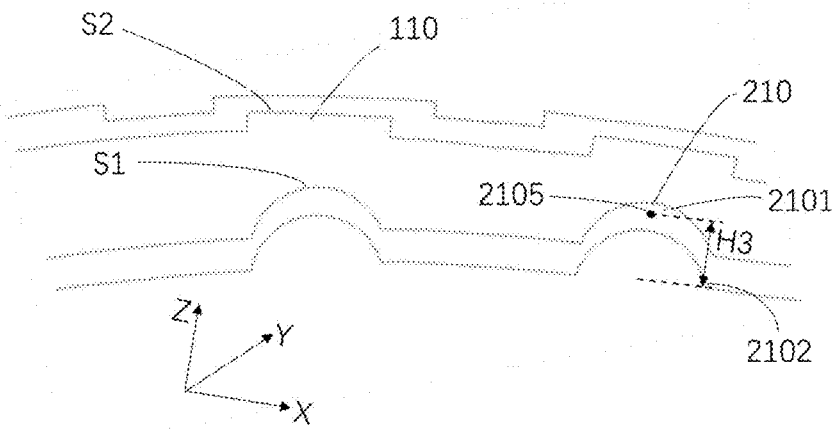
FIG. 2a is a schematic structural diagram II of a negative electrode sheet and a positive electrode sheet of a jelly roll provided in an embodiment of the present application.
Figure 2B:
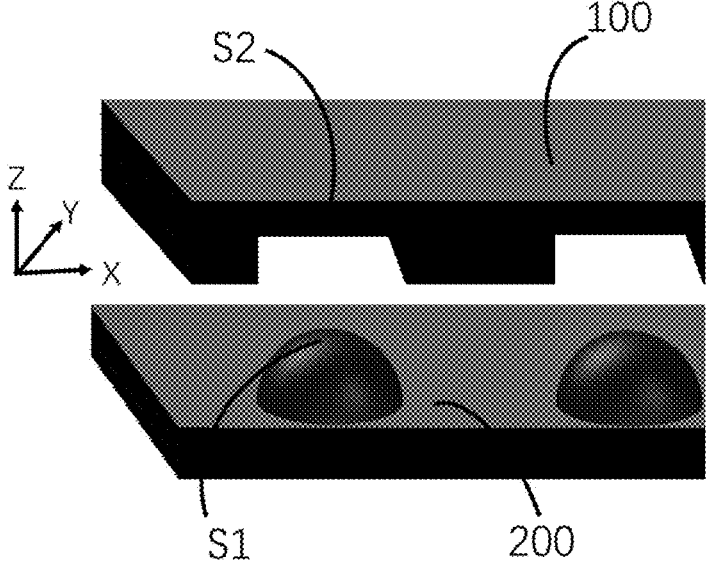
FIG. 2b is a schematic structural diagram III of a negative electrode sheet and a positive electrode sheet of a jelly roll provided in an embodiment of the present application.
Figure 2C:
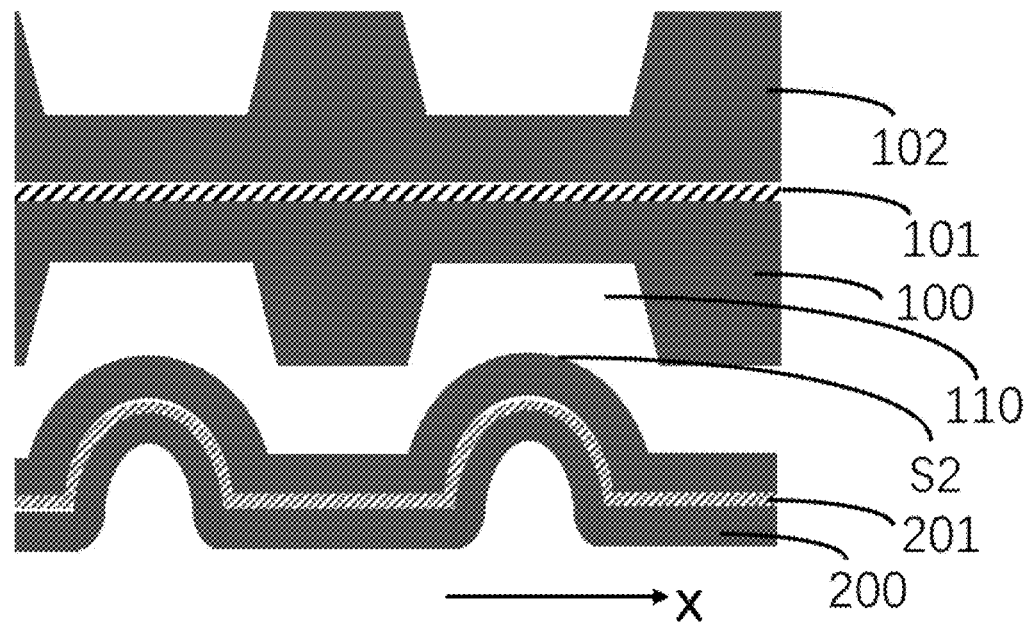
FIG. 2c is a schematic structural diagram IV of a negative electrode sheet and a positive electrode sheet of a jelly roll provided in an embodiment of the present application.

Referring to FIG. 2, an embodiment of the present application provides a jelly roll including: a negative electrode sheet 100 and a positive electrode sheet 200, the negative electrode sheet 100 and the positive electrode sheet 200 are laminated, and the negative electrode sheet 100 and the positive electrode sheet 200 have opposite polarity.

Figure 3:
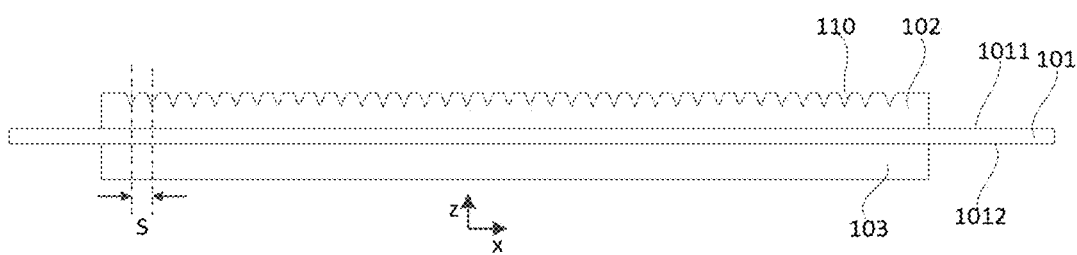
FIG. 3 is a schematic structural diagram I of a negative electrode sheet of a jelly roll provided in an embodiment of the present application.
Figure 5:
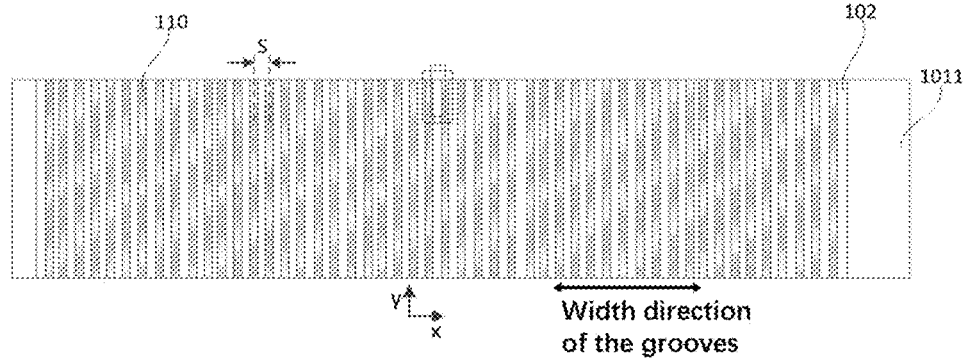
FIG. 5 is a top view schematic structural diagram of a negative electrode sheet of a jelly roll provided in an embodiment of the present application.

Referring to FIGS. 3 and 5, the negative electrode sheet 100 includes a negative electrode current collector 101, the negative electrode current collector 101 has a first surface 1011 and a second surface 1012 provided opposite to each other along a first direction (z-axis shown in the figures), the first surface 1011 being provided with a first coating layer 102, and the second surface 1012 being provided with a second coating layer 103. Similarly, the positive electrode sheet 200 includes a positive electrode current collector 201, the positive electrode current collector 201 has a third surface 2011 and a fourth surface 2012 provided opposite to each other along a first direction (z-axis shown in the figures), the third surface 2011 being provided with a third coating layer 202, and the fourth surface 2012 being provided with a fourth coating layer 203.

The first coating layer 102 is provided with a plurality of grooves 110 each extending along a second direction (y-axis shown in the figures), and the plurality of grooves 110 are spaced at the same distance along a third direction (x-axis shown in the figures); that is, each of the plurality of grooves 110 extends along a width direction of the negative electrode sheet 100 (i.e., y direction), and a plurality of the grooves 110 are provided at intervals along a width direction of the grooves, corresponding to a length direction of the negative electrode sheet 100.

Figure 8:
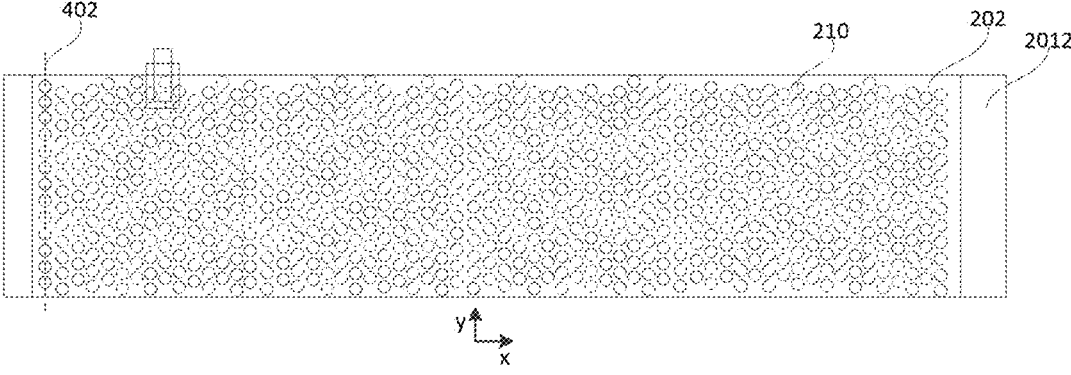
FIG. 8 is a top view schematic structural diagram I of a positive electrode sheet of a jelly roll provided in an embodiment of the present application.
Figure 9:
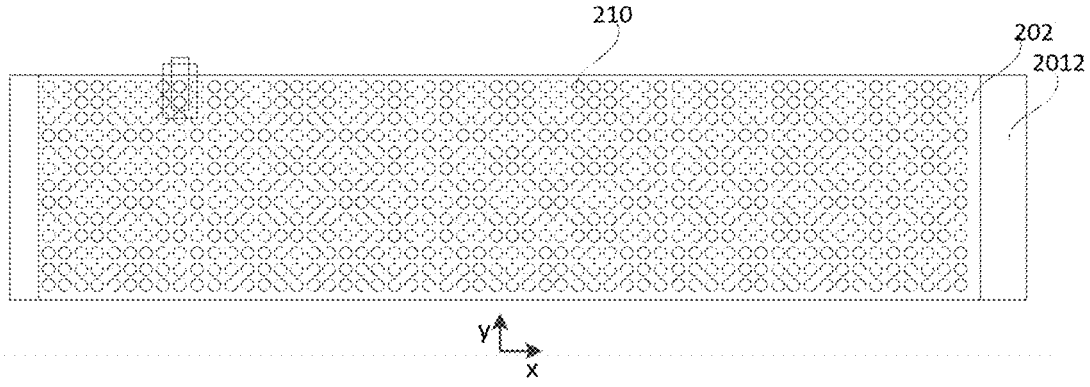
FIG. 9 is a top view schematic structural diagram II of a positive electrode sheet of a jelly roll provided in an embodiment of the present application.
Figure 10:
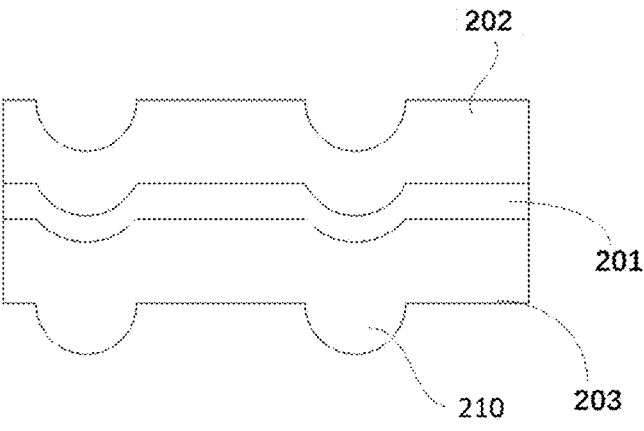
FIG. 10 is a schematic structural diagram of a convex part of a positive electrode sheet of a jelly roll provided in an embodiment of the present application.

Referring to FIGS. 8-10, the positive electrode sheet 200 has a plurality of convex parts 210 arranged in an array, and a plurality of concave parts 211 arranged in an array, and the convex parts 210 and the concave parts 211 are provided opposite to each other; the convex parts 210 may be protrusions on an upper surface of the positive electrode sheet 200, and the concave parts 211 may be depressions on a lower surface of the positive electrode sheet 200.

Where, when the negative electrode sheet 100 and the positive electrode sheet 200 are provided in a laminated manner, the first coating layer 102 and the fourth coating layer 203 are opposite to each other in a first direction (z-axis shown in the figures); at the same time, the grooves 110 on the first coating layer 102 and the convex parts 210 on the fourth coating layer 203 are provided opposite to each other along the first direction (z-axis shown in the figures).

Figure 2D:
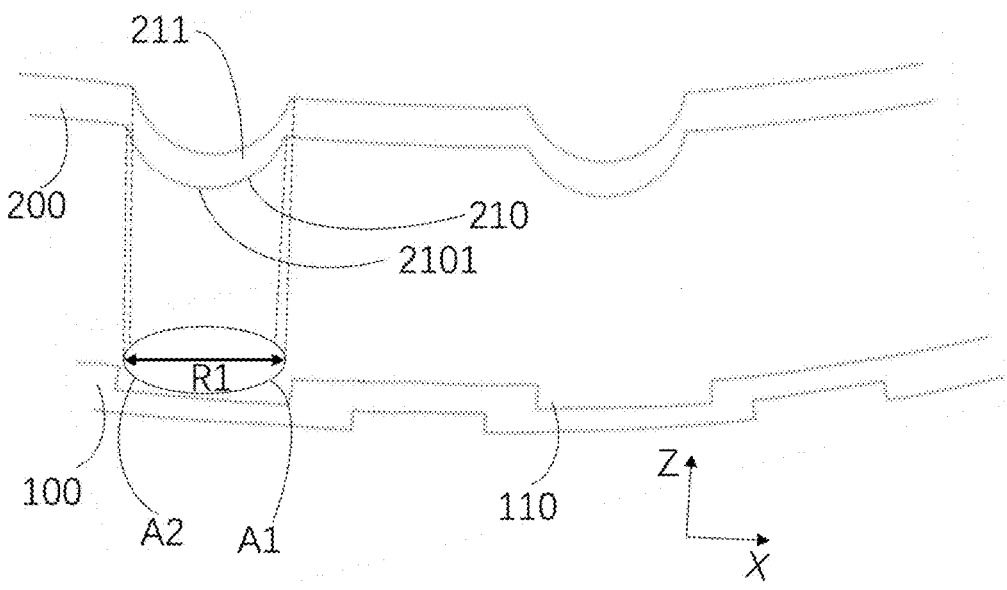
FIG. 2d is a schematic structural diagram of a vertical projection of a convex part and a vertical projection of a concave part provided in an embodiment of the present application.

The surface on which the convex parts of the positive electrode sheet are located and the surface on which the grooves of the negative electrode sheet are located being provided opposite to each other refers to that: vertical projections A1 (as shown in FIG. 2d) of the convex parts 210 along the first direction and vertical projections of the grooves 110 along the first direction (z-axis shown in the figures) at least partially overlap, or vertical projections A1 of the convex parts 210 along the first direction and vertical projections of the grooves 110 along the first direction fully overlap. Vertical projections A2 of the concave parts 211 along the first direction is shown in FIG. 2d.

The jelly roll provided in the embodiments of the present application increases the micro-spacing between the negative electrode sheet 100, the separator and the positive electrode sheet 200 by providing the convex parts 210 and the concave parts 211 corresponding to the convex parts 210 on the positive electrode sheet 200, and the convex parts provide support for contact with the separator, so that there is a certain degree of support between the negative electrode sheet 100 and the positive electrode sheet 200, and these micro-spacings form spaces that can accommodate the electrolyte so that the electrolyte has a sufficient infiltration amount to the electrode sheet, to avoid occurrence of abnormal situations such as insufficient electrolyte between the electrode sheets and the separator caused by the interlayer extrusion of the electrode sheets, poor infiltration, or even lithium precipitation of the negative electrode sheet, to ensure a sufficient amount of infiltration of the electrolyte.

The jelly roll provided in the embodiments of the present application is provided with grooves 110, which is directly facing the convex parts 210, on the negative electrode sheet 100, to provide the expansion space for the expansion of the negative electrode sheet, thereby mitigating the extrusion and deformation of the convex parts of the positive electrode or deformation of the grooves of the negative electrode caused by expansion of the negative electrode sheet during the process of hot-pressing formation or charging and discharging of the battery, and ensuring structural strength of the convex parts and the grooves, as well as an interface bonding strength between the electrode sheets and the separator, to stably play a support role for the separator, and at the same time, sufficient expansion space can also prevent the negative electrode sheet from extruding the separator during expansion and consequent deformation of the separator.

Continuing to refer to FIG. 3, in the embodiments of the present application, the centers of two adjacent grooves 110 are provided apart at a first distance S; a size of vertical projections of the convex parts 210 in the thickness direction of the electrode sheet is a first width R1, and the first width R1 is greater than the first distance S.

In this way, when the convex parts 210 are facing the grooves 110, it may prevents the convex parts 210 from being embedded in the grooves 110 of the negative electrode, and facilitates a formation of a SEI film on the convex parts of the positive electrode, thereby forming an effective protection for the convex parts 210 of the positive electrode, and preventing decreased structural stability of active materials of the positive electrode, and accelerated decay of battery capacity due to breakage of active particles of the convex parts 210 of the positive electrode or even cobalt precipitation.

In an embodiment of the present application, a ratio between the first width R1 and the first distance S is: R1/S=1.02~8.

In the above ratio range, it is possible to mitigate the extrusion and deformation of the convex parts 210 of the positive electrode or deformation of the grooves 110 of the negative electrode caused by expansion of the negative electrode sheet expands during the process of hot-pressing formation or charging and discharging of the battery.

If the ratio between the first width R1 and the first distance S is less than 1.02, it indicates that the groove width corresponding to the first distance S is large, and when the negative electrode sheet 100 expands and results in the interlayer extrusion of the electrode sheets, the convex parts 210 of the positive electrode are easy to be embedded in the grooves 110 of the negative electrode, which is easy to cause damage to the SEI film on the convex parts of the positive electrode and thus the convex parts of the positive electrode is unprotected; if the ratio between the first width R1 and the first distance S is greater than 8, it indicates that the groove width corresponding to the first distance S is small, and then the setting of the first distance S is meaningless, and the first distance S will not be able to provide expansion space for the expansion of the negative electrode sheet, and also cannot mitigate the extrusion and deformation of the convex parts of the positive electrode or deformation of the grooves of the negative electrode caused by expansion of the negative electrode sheet during the process of hot-pressing formation or charging and discharging of the battery.

Referring to FIG. 15, 10 types of jelly rolls (jelly rolls 1-10) are provided, and the above ratio relationship is explained through 10 embodiments. Where, 10 types of jelly rolls have different first widths R1 and first distances S respectively, and the first width R1 and first distance S of each type of jelly roll have the above-mentioned ratio relationship.

For the 10 types of jelly rolls with the above-mentioned ratio relationship, when the positive electrode sheets and the negative electrode sheets of the jelly rolls expand and lead to interlayer extrusion of the electrode sheets, especially when the interlayer extrusion in the corner sections is intensified, the convex parts 210 can be prevented from being embedded in the grooves 110, preventing the convex parts 210 from deformation or the grooves 110 from deformation.

In one embodiment, the ratio between the first width R1 and the first distance S is: R1/S=1.05~4.

In an embodiment of the present application, the first width is R1=0.3 mm~8 mm.

When the first width R1 is less than 0.3 mm, it is easy to cause the tip effect, that is, highest points of the convex parts 210 are formed as a sharp protrusion, which will lead to damage to separator; when the first width R1 is greater than 8 mm, convex surfaces of the convex parts 210 have a large span, which is not conducive to playing a supporting role between the positive electrode sheet and the negative electrode sheet.

In one embodiment, the first width is R1=1 mm~3 mm.

It should be noted that when the projections of the convex parts 210 on the electrode sheet are fitted to a circle, the first width R1 of the projections of the convex parts 210 on the electrode sheet may be a diameter of the circle.

In an embodiment of the present application, a center spacing of projections between two adjacent convex parts 210 on the negative electrode sheet 100 is D1, D1=1 mm~6 mm.

When the center spacing D1 is less than 1 mm, it is easy to cause the convex parts 210 to overlap or the density of the convex parts is too high. In this case, when forming the convex parts, a roller pressure is too high and the convex parts are too dense, and during the process of charging and discharging, the interlayer stress of the cell is difficult to release, which may easily lead to falling off of particles from the electrode sheets. When the center spacing D1 is greater than 6 mm, the convex surfaces of the two convex parts 210 have a large span therebetween and cannot play a supporting role.

In one embodiment, the center spacing is D1=1.5 mm~4 mm.

In an embodiment of the present application, the grooves 110 have a groove width M in a third direction (x-axis shown in the figures), the first width R1 is greater than the groove width M, and a ratio between the first width R1 and the groove width M may be: R1/M=8~50.

In the above ratio range, it is possible to mitigate the extrusion and deformation of the convex parts 210 of the positive electrode or deformation of the grooves 110 of the negative electrode caused by expansion of the negative electrode sheet during the process of hot-pressing formation or charging and discharging of the battery.

If the ratio between the first width R1 and the groove width M is lower than 8, it indicates that the groove width of the grooves 110 is larger, and when the negative electrode sheet expands and results in the interlayer extrusion of the electrode sheets, especially when interlayer extrusion in the corner sections is intensified, the convex parts 210 are easy to be embedded in the grooves 110, which is easy to cause damage to the SEI film on the convex parts of the positive electrode and the convex parts of the positive electrode is unprotected; if the ratio between the first width R1 and the groove width M is greater than 50, it indicates that the groove width of the grooves 110 is smaller, and then the setting of the grooves 110 will be meaningless, and it is difficult for the grooves 110 to store sufficient electrolyte and will not be able to provide expansion space for the expansion of the negative electrode sheet, and also will not be able to mitigate the extrusion and deformation of the convex parts 210 of the positive electrode or deformation of the grooves 110 of the negative electrode caused by expansion of the negative electrode sheet during the process of hot-pressing formation or charging and discharging of the battery.

Referring to FIG. 17, 10 types of jelly rolls (jelly rolls 1-10) are provided respectively, and the above ratio relationship is illustrated by 10 embodiments. Where, 10 types of jelly rolls have different first widths R1 and groove widths M respectively, and the first width R1 and grove width M of each type of jelly roll have the above-mentioned ratio relationship.

For the 10 types of jelly rolls with the above-mentioned ratio relationship, when the positive electrode sheets and the negative electrode sheets of the jelly roll expand and lead to interlayer extrusion of the electrode sheets, especially when interlayer extrusion in the corner sections is intensified, the convex parts 210 can be prevented from being embedded in the grooves 110, preventing the convex parts 210 from deformation or the grooves 110 from deformation.

In one embodiment, the ratio between the first width R1 and the groove width M may be R1/M=16~40.

In an embodiment of the present application, the grooves 110 have a groove width M in a third direction (x-axis shown in the figures), and the groove width is M=30 μm~170 μm. It is ensured that the groove width M of the grooves 110 is within the above range. When the groove width M is less than 30 μm, the groove width M is too small, and the setting of the grooves 110 will be meaningless, resulting in that the grooves 110 will not be able to provide an expansion space for the expansion of the negative electrode sheet, and will not be able to mitigate the extrusion and deformation of the convex parts 210 of the positive electrode or deformation of the grooves 110 of the negative electrode caused by expansion of the negative electrode sheet during the process of hot-pressing formation or charging and discharging of the battery. When the groove width M is greater than 170 μm, the convex parts 210 of the positive electrode are easy to be embedded in the grooves 110 of the negative electrode when the negative electrode sheet 100 expands and results in the interlayer extrusion of the electrode sheet.

In one embodiment, the groove width is M=60 μm~120 μm.

The grooves 110 have a groove depth T in a first direction (z-axis shown in the figures), and the groove depth is T=10 μm~60 μm. When the groove depth T is less than 10 μm, it will not be able to mitigate the deformation of the convex parts 210 caused by expansion of the electrode sheet during the process of charging and discharging, and it will also have an impact on increasing an amount of stored electrolyte; and when the groove depth T is greater than 60 μm, it will affect a thickness of the negative electrode sheet, and an area in which the grooves 110 are provided is easy to break.

In one embodiment, the groove depth is T=12 μm~30 μm.

A plurality of grooves 110 are spaced apart by a same distance in the second direction (y-axis shown in the figures), and centers of two adjacent grooves 110 are spaced apart by the first distance S, the first distance S=0.5 mm~3 mm. When the first distance S is less than 0.5 mm, the setting of the grooves 110 will be meaningless, and it will easily lead to the deformation of the convex parts 210 or the deformation of the grooves 110 caused by expansion of the electrode sheets during the process of charging and discharging; and when the first distance S is greater than 3 mm, it indicates that the first width R1 of the convex parts 210 corresponding to it also needs to be increased, and when the first width R1 is too large, the protruding surfaces of the convex parts 210 have a larger span, which is not conducive to playing a supporting role between the positive electrode sheet and the negative electrode sheet.

Continuing to refer to FIG. 3, in a cross-section where the first direction (z-axis shown in the figures) is located, a cross-section shape of the grooves 110 may be V-shaped.

Figure 4:
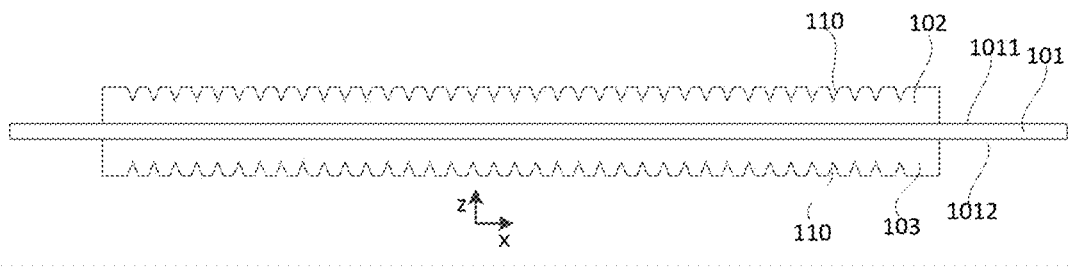
FIG. 4 is a schematic structural diagram II of a negative electrode sheet of a jelly roll provided in an embodiment of the present application.

Continuing to refer to FIG. 4, the first surface 1011 and the second surface 1012 of the negative electrode current collector 101 are each provided with a plurality of grooves 110; the convex parts 210 and the grooves 110 are provided opposite to each other; and the concave parts 211 and the grooves 110 are provided opposite to each other.

In other words, the grooves are provided on both sides of the negative electrode sheet 100, so that while the convex parts 210 of the positive electrode and the grooves 110 of the negative electrode are provided opposite to each other, the concave parts 211 of the positive electrode and the grooves 110 of the negative electrode are also provided opposite to each other. The concave parts 211 of the positive electrode and the grooves 110 of the negative electrode being provided opposite to each other may increase a space between the positive electrode sheet 200 and the negative electrode sheet 100, to provide a larger space for infiltration of the electrolyte, and thus to increase an amount of the stored electrolyte.

In an embodiment of the present application, the jelly roll includes a straight section and corner sections located at two opposite ends of the straight section, the corner sections having a first thickness H1, the straight section having a second thickness H2, and the first thickness H1 and the second thickness H2 having a following relationship: H1/(H2/2)=1.05~1.5.

It should be noted that the second thickness H2 of the straight section is a thickness in vertical direction shown in FIG. 1, the corner sections are formed as a circular arc, and the first thickness H1 of the corner sections is a radius of the circular arc. In one embodiment, the thickness of the straight section may also refer to the thickness of all straight sections of the cell, i.e., the thickness of the cell, and correspondingly, the thickness of the corner sections is the thickness of all corner sections measured at midpoint of the line connecting two ends of the innermost corner section in the width direction.

Referring to FIG. 14, 10 types of jelly rolls (jelly rolls 1-10) are provided respectively, and the above thickness relationship is explained by 10 embodiments. Where, 10 types of jelly rolls each have different thicknesses in the straight sections and the corner sections, and the thickness in the straight section and thickness of the corner sections of each type of jelly roll have the above-mentioned thickness relationship.

Due to the structural characteristics and the stress accumulation of the corner section, the outward expansion of the corner sections is bound, which ultimately leads to the problem of lithium precipitation caused by interlayer extrusion of the electrode sheet. In the 10 types of jelly rolls provided by the embodiment of the present application, providing the convex parts 210 and the concave parts 211 corresponding to the convex parts 210 on the positive electrode sheet 200 of each type of jelly roll, and providing the grooves 110 directly opposite to the convex parts 210 on the negative electrode sheet 100 need to achieve the above thickness relationship, and the setting of the above thickness relationship may effectively improve the lithium precipitation problem in the corner section and at the same time, ensure that thicknesses of the convex parts and the grooves in the corner section and the straight section are matched, so that the interlayer interaction force of the cell is appropriate, ensuring that protrusions of the positive electrode sheet and grooves of the negative electrode will not be deformed in the process of charging and discharging.

In one embodiment, the first thickness H1 and the second thickness H2 have a following relationship: H1/(H2/2) =1.08~1.3.

Referring to FIG. 9, in an embodiment of the present application, the positive electrode sheet 200 includes an upper surface and a lower surface that are provided opposite to each other, and the convex parts are formed by protruding outward from the upper surface of the positive electrode sheet 200; referring to FIGS. 2a, 2b, 2c and 11a, the convex parts 210 each include a protruding part 2101 and a root part 2102 connecting the protruding part 2101 with the upper surface.

In a first direction (z-axis shown in the figures), the root part of the convex part 210 intersects the surface of the positive electrode sheet 200, and the root part of the convex part 210 has a vertical distance from a vertex of the protruding part 2105, the vertical distance being H3=3 μm~80 μm.

When the vertical distance H3 is less than 3 μm, it is indicated that the convex part 210 is too small to play a supporting role between the positive electrode sheet and the negative electrode sheet, and the convex part 210 is an ineffective protrusion, which also does not allow sufficient infiltration of the electrolyte; and when the vertical distance H3 is greater than 80 μm, it is indicated that the convex part 210 is too large, which will lead to serious delamination between the positive electrode sheet and the negative electrode sheet and cause new interface problem.

Where, the extrusion of the corner section mainly occurs in layers of the jelly roll near an inner circle, the closer to an outer circle, smaller the extrusion pressure, the less likely the electrolyte is to be deficient, and the lower the risk of lithium precipitation. Therefore, the vertical distance H31 of the convex parts 2103 of the innermost circle of the jelly roll being greater than the vertical distance H32 of the convex parts of the outermost circle 2104 of the jelly roll (as shown in FIG. 11a) may increase an amount of electrolyte retained in the innermost circle of the jelly roll, to ensure that lithium precipitation will not occur in the inner circle of the cell, and so on; furthermore, the corner section of the inner circle has smaller convex parts, which can reduce a width of the corner section, thereby improving the problem of over-width of the cell and improving the energy density of the cell.

Referring to FIG. 16, vertical distances H3 of all circles in a jelly roll are provided respectively to illustrate the above relationship.

The innermost circle of the jelly roll refers to the circle where a winding start section of the electrode sheet is located, the outermost circle of the jelly roll refers to the circle where a winding end section of the electrode sheet is located, and there are also a plurality of intermediate circles between the innermost circle of the jelly roll and the outermost circle of the jelly roll.

A first intermediate circle is adjacent to the innermost circle of the jelly roll and the first intermediate circle surrounds the innermost circle of the jelly roll, a second intermediate circle is adjacent to the first intermediate circle and the second intermediate circle surrounds the first inter-mediate circle, and so on, up to the outmost circle of the jelly roll.

When the vertical distance H31 of the convex parts 2103 of the innermost circle of the jelly roll is 80 μm, the vertical distance H3 of the convex parts 210 of the first intermediate circle may be 75 μm; the vertical distance H3 of the convex parts 210 of the second intermediate circle may be 70 μm; the vertical distance H3 of the convex parts 210 of the third intermediate circle may be 65 μm; and the vertical distance H32 of the convex parts of the outmost circle of the jelly roll may be 3 μm.

Figure 11:
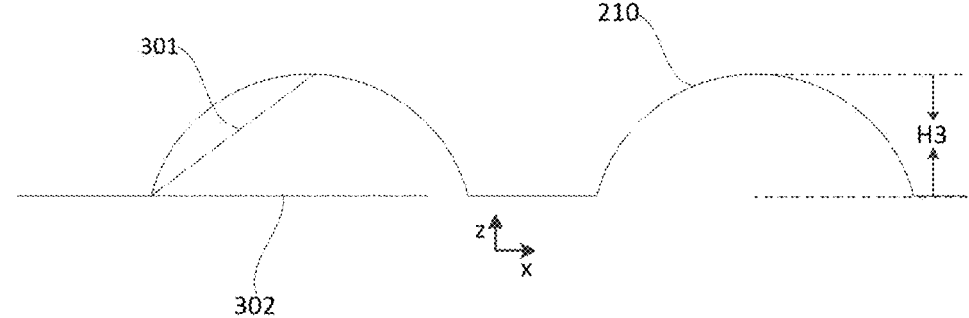
FIG. 11 is a schematic diagram of a slope of a convex part provided in an embodiment of the present application.
Figure 11A:
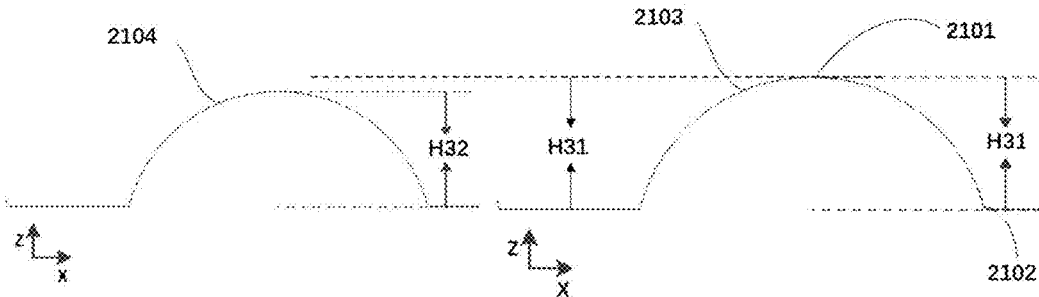
FIG. 11a is a schematic diagram showing a first vertical distance of a convex part of an innermost circle of the jelly roll is greater than a second vertical distance of a convex part of an outermost circle of the jelly roll provided in an embodiment of the present application.
Figure 12:
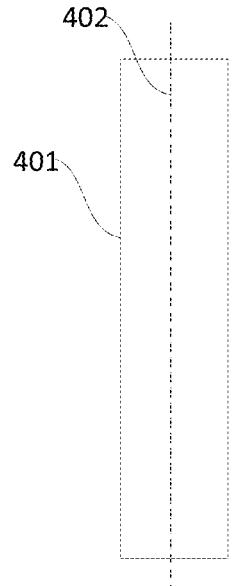
FIG. 12 is a schematic diagram I of an intersection of a convex part and a groove provided in an embodiment of the present application.
Figure 13:
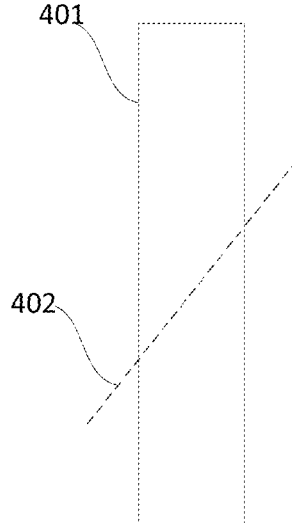
FIG. 13 is a schematic diagram II of an intersection of a convex part and a groove provided in an embodiment of the present application.

Continuing to refer to FIG. 11, in an embodiment of the present application, the convex parts 210 are formed by protruding outward from the upper surface of the positive electrode sheet 200; the convex parts 210 each include a protruding part 2101 and a root part 2102 connecting the protruding part 2101 with the upper surface. The root part 2102 of the convex part 210 intersects with the upper surface of the positive electrode sheet 200, and a line connecting the root part 2102 of the convex part 210 with a vertex of the convex part 210 is a first connecting line 301, and an angle between the first connecting line 301 and the first horizontal plane 302 is a first angle, and the first angle is 3°~45°.

When the first angle is less than 3°, the convex part 210 is too small to play a supporting role between the positive electrode sheet and the negative electrode sheet; and when the first angle is greater than 45°, the convex part 210 has an excessively high slope, which will result in the problem of a protruded tip, which is easy to pierce the separator to cause a safety problem.

In one embodiment, the first angle may be 5°~25°.

In an embodiment of the present application, the shape of the convex part 210 may include a circle, a semicircle, an ellipse, a plum blossom shape, a polygon, a rhombus, a capsule shape, or an island shape, and the like.

In an embodiment of the present application, the positive electrode sheet 200 includes an upper surface and a lower surface, which are provided opposite to each other, and the convex part is formed by protruding outward from the upper surface of the positive electrode sheet 200; and the convex part 210 includes a protruding part 2101 and a root part 2102 connecting the protruding part 2101 with the upper surface.

The protruding part has an arc-shaped surface, and/or the protruding part is connected to the upper surface through an arc-shaped edge surface, and edges of the convex parts having a polygonal shape, a diamond shape, or an island shape are an arc edge.

That is, when the shape of the convex part 210 is a shape having corners such as a polygon or a diamond shape, the corners of the convex part 210 are all provided as arc corners; or when the shape of the convex part 210 is a shape having distinctly sharp edges such as a polygon or a dia-mond shape, the edges of the convex part 210 are arc edges.

It is avoided that the convex part has a sharp edge, to prevent the edge of the convex part from falling off of powders during processing; at the same time, it is avoided that the edge or top of the convex part pierces a coating paste of the positive electrode, to prevent cracks from occurring in the coating paste and causing falling off of powders, and the powders fallen off are easy to fall onto the negative electrode sheet, thereby leading to the risk of short-circuiting and fire; furthermore, it may prevent the top of the convex part from piercing the separator and contacting with the negative electrode sheet, leading to short-circuiting.

In one embodiment, the shape of the convex part 210 may be a round-like shape without sharp edge and corner.

It should be noted that when the state of the positive electrode sheet 200 is tested using a 3D profilometer, it can be clearly detected that the edge of the convex part 210 exhibits a round-like shape.

Figure 7:
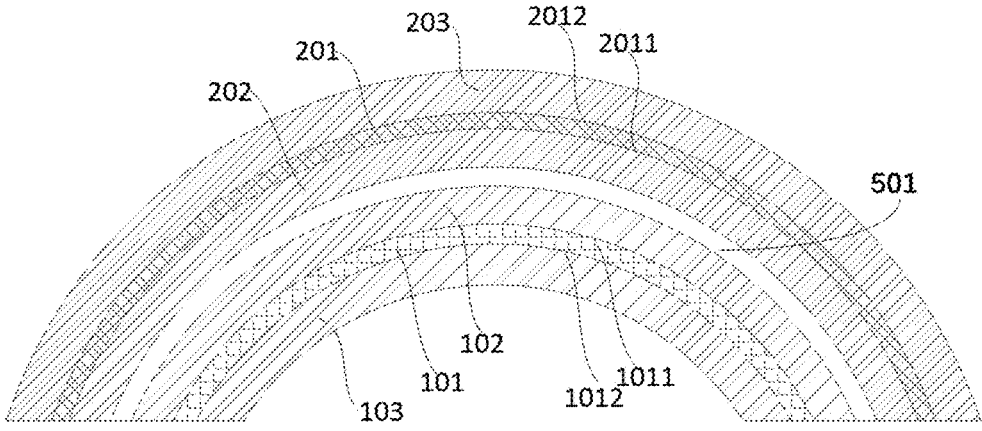
FIG. 7 is a schematic structural diagram of a layered arrangement of a positive electrode sheet and a negative electrode sheet in a corner section of a jelly roll provided in an embodiment of the present application.

Continuing to refer to FIGS. 2 and 7, in an embodiment of the present application, the negative electrode sheet 100 and the positive electrode sheet 200 are wound around a first central plane 501 a surface of the positive electrode current collector 201 facing the first central plane 501 is a third surface 2011, a surface of the positive electrode current collector 201 away from the first central plane 501 is a fourth surface 2012, the third surface 2011 is provided with a third coating layer 202, the fourth surface 2012 is provided with a fourth coating layer 203, and the convex part 210 protrudes from the third coating layer 202 to the fourth coating layer 203.

Where, the first central plane is a horizontal plane per-pendicular to a paper surface and located at the innermost circle of the jelly roll in FIG. 1.

Due to a curvature of the corner section, the first surface of the silicon-doped negative electrode sheet is subjected to a greater extrusion force than the second surface of the silicon-doped negative electrode sheet, and in the event of an expansion of the silicon-doped negative electrode sheet as a whole, the degree of expansion of the second surface is greater than the degree of expansion of the first surface, which may easily result in cracks appearing on the second surface of the negative electrode sheet; the grooves of the first surface of the negative electrode are provided opposite to the third surface of the positive electrode, i.e., the grooves of the second surface of the negative electrode and the third surface of the positive electrode are provided opposite to each other. When the second surface of the negative elec-trode expands severely, a part of the coating layer of the second surface can enter into the concave parts of the positive electrode, releasing the stress of the expansion of the negative electrode, so as not to affect the depth of the convex parts of the positive electrode, and to ensure a normal support role of the convex parts of the positive electrode.

Due to the curvature of the corner section, when an arc formed by the third coating layer 202 wraps the negative electrode sheet 100, a circumference of the arc of the third coating layer 202 is greater than a circumference of the negative electrode sheet in the corner section, resulting in an amount of active materials of the positive electrode in this area being larger than an amount of active materials of the positive electrode in this area when the positive electrode is designed, i.e., a ratio of the negative electrode surface capacity to the positive electrode surface capacity in this area is decreased, resulting in a risk of lithium precipitation.

In the case that nothing can be done to change the above fact, in an embodiment of the present application, by setting the convex part protruding from the third coating layer to the fourth coating layer, and by the grooves of the first surface of the negative electrode being provided opposite to the concave part of the third surface of the positive electrode, a migration path of the positive electrode active material in the concave part is longer, and migration paths of the positive electrode active material in the other parts are shorter, thereby reducing the positive electrode active material in the concave part participating in the charging and discharging reaction, so that the coating layer of the negative electrode on the third surface has sufficient sites for de-intercalating lithium ions, which increases a CB value (negative electrode surface capacity/positive electrode surface capacity) of the area, and reduces the probability of lithium precipitation in the area.

Figure 6:
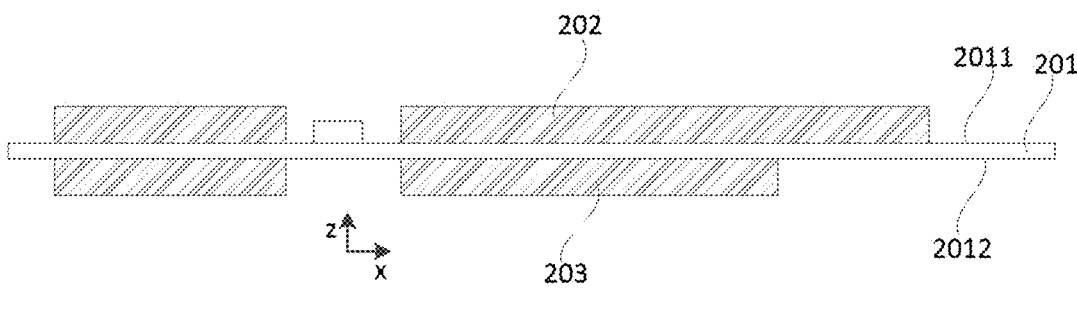
FIG. 6 is a schematic structural diagram of a positive electrode sheet of a jelly roll provided in an embodiment of the present application.

Continuing to refer to FIGS. 6 and 7, in an embodiment of the present application, a sum of projected areas of a plurality of the convex parts 210 on the negative electrode sheet is 60%~90% of an area of the fourth coating layer 203, to ensure the support effect of the convex parts 210; if it is lower than 60%, the support effect of the convex parts 210 will be affected; and if it is higher than 90%, it will have an effect on the normal functioning of the coating layer.

Meanwhile, the jelly roll further includes an electrolyte doped with 1,4-dicyano-2-butene, a content of the 1,4-dicyano-2-butene in the electrolyte being 0.05%~3%.

The electrolyte infiltrated between the positive electrode sheet and the negative electrode sheet is further doped with a certain amount of 1,4-dicyano-2-butene, so that the electrolyte is able to play a film-forming protective role for the convex parts 210 of the positive electrode; and to prevent decreased structural stability of active materials of the positive electrode and accelerated decay of the battery capacity due to breakage of the active particles of the convex parts 210 of the positive electrode or even cobalt precipitation.

When the content of the 1,4-dicyano-2-butene is lower than the above range, it cannot play a protective role for the edges of the convex parts 210; when the content of the 1,4-dicyano-2-butene is higher than the range, it will have an impact on the normal use of the electrolyte.

Referring to FIG. 10, in an embodiments of the present application, the projection of each convex part 210 on the first horizontal plane (a horizontal plane where the y-axis is located) has a center point, and some of the center points are distributed on the second connecting line 402, and the second connecting line 402 is parallel to the second direction (y-axis shown in the figures); and the projection of the grooves 110 on the first horizontal plane is a rectangle 401, and the second connecting line 402 is parallel to the rectangle 401.

When the second connecting line is parallel to the rectangular surface, it enables each of the plurality of convex parts located on the second connecting line to be provided opposite to one groove, making the processing of the convex parts and the grooves more convenient.

Referring to FIG. 11, in another embodiment of the present application, the projection of each convex part 210 on the first horizontal plane (horizontal plane in which y-axis is located) has a center point, and some of the center points are distributed on the second connecting line 402, and the second connecting line 402 is parallel to the second direction (y-axis shown in the figures); each groove 110 is projected as a rectangle 401 on the first horizontal surface, and the second connecting line 402 intersects with the rectangle 401; when the second connecting line 402 intersects with the rectangle 401, an angle between the second connecting line 402 and the rectangle 401 is 0° ~45°.

When the second connecting line intersects with the rectangular surface, the plurality of convex parts located on the second connecting line are respectively provided opposite to different grooves, at the same time, by defining the angle between the second connecting line and the rectangular surface to be within the above range, it may be ensured that each convex part on the second connecting line can be provided opposite to the groove.

Referring to FIG. 7, in an embodiment of the present application, the first coating layer 102 and/or the second coating layer 103 includes a silicon-carbon composite material and/or a silicon-oxygen composite material, and a mass proportion(s) of the silicon-carbon composite material and/or the silicon-oxygen composite material in the first coating layer 102 and/or the second coating layer 103 is/are less than or equal to 50 wt %.

The silicon-carbon composite material includes a porous carbon matrix, silicon grains located in pores of the porous carbon matrix, and a carbon layer located on a surface of the porous carbon matrix. In the present disclosure, the silicon grains may be provided in the pores of the porous carbon matrix by deposition, and by providing the silicon grains in the pores and by forming a carbon layer, which may be a crystalline carbon or an amorphous carbon, on the surface of the porous carbon matrix, which can be a stylised carbon or an amorphous carbon, an interior of the porous carbon matrix can provide sufficient expansion space when the silicon grain expands, thereby preventing deformation of the overall structure of the silicon carbon composite material, and the outward expansion force of the porous carbon matrix during expansion of the silicon can be constrained by the carbon layer, to ensure the structural strength of the silicon carbon material, thereby avoiding cracking, pulverization, and falling off of the negative electrode active layer, and improving the cycling performance and rate performance of the battery.

In one specific embodiment, the carbon layer includes openings provided corresponding to the pores of the porous carbon substrate. Providing the openings on the carbon layer may improve the infiltration of the electrolyte to the negative electrode sheet, and may reduce the expanding property of the silicon-based material, thereby reducing an impedance of the battery, and improving the cycling performance and the rate performance of the battery.

In one specific embodiment, a specific surface area of the silicon-carbon composite material and/or the silicon-oxygen composite material is 0.5-10 $m^2/g$, for example, 0.5 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, or 10 $m^2/g$, and the like. When the specific surface area in the silicon-carbon composite and/or the silicon-oxygen composite is within the above range, the SEI film formed on the surface of the negative electrode active layer during the process of charging and discharging is appropriate, and it can reduce the impedance of the battery, and improve the cycling performance and the rate performance of the battery.

In one specific embodiment, a particle diameter Dv50 of the silicon-carbon composite material and/or the silicon-oxygen composite material is 6-15 μm, for example, 6 μm, 7 μm, 8 μm, 9 μm, 10 μm, 11 μm, 12 μm, 13 μm, 14 μm, or 15 μm. When the particle diameter Dv50 of the silicon-carbon composite material and/or the silicon-oxygen composite material is in the above range, the particle diameter Dv50 of the silicon-carbon composite material is appropriate, which may avoid the increase in the specific surface area of the silicon particles and thus the increase in the side reactions due to too small particle diameter; and at the same time, may avoid blockage of the pores of the porous carbon matrix and consequent influence on infiltration of the electrolyte due to too large particle size and thus excessive expansion of the silicon particles. Thus, the cycling and rate performances of the battery can be improved.

In one specific embodiment, a powder resistivity of the silicon-carbon composite material and/or the silicon-oxygen composite material is 0.1-1000 $\Omega$·cm, for example, 0.1 $\Omega$·cm, 0.5 $\Omega$·cm, 1 $\Omega$·cm, 5 $\Omega$·cm, 10 $\Omega$·cm, 50 $\Omega$·cm, 100 $\Omega$·cm, 200 $\Omega$·cm, 300 $\Omega$·cm, 400 $\Omega$·cm, 500 $\Omega$·cm, 600 $\Omega$·cm, 700 $\Omega$·cm, 800 $\Omega$·cm, 900 $\Omega$·cm, or 1000 $\Omega$·cm. When the powder resistivity of the silicon-carbon composite material and/or the silicon-oxygen composite material is within the above range, the silicon-carbon composite material and/or the silicon-oxygen composite material has a high electrical conductivity, which can enhance the electrical conductivity of the negative electrode active layer, thereby improving the cycling performance and rate performance of the battery.

In one specific embodiment, a silicon content in the silicon-carbon composite material and/or the silicon-oxygen composite material is 30-75%, for example, 30%, 35%, 40%, 45%, 50%, 55%, 60%, 65%, 70%, or 75%, and the like. When the silicon content in the silicon-carbon composite material is within the above range, it may avoid that the silicon content in the silicon-carbon composite material is too high, which leads to excessive expansion of the silicon-carbon composite material, causing the overall structure of the silicon-carbon composite material to be deformed. Thus, it may avoid cracking and pulverization of the negative electrode active layer, to ensure that the energy of the silicon-carbon composite material is utilized, and improve the cycling performance and rate performance of the battery.

The third surface 2011 of the positive electrode current collector 201 is an inner side surface of the positive electrode, and the first surface 1011 of the corresponding negative electrode current collector 101 is an outer side surface of the negative electrode. Since expansion of the outer side surface of the negative electrode in the arc area is larger, and the silicon-carbon composite material of the negative electrode has a large expansion by itself, based on which, the grooves 110 of the outer side surface of the negative electrode corresponding to the concave parts 211 of the inner side surface of the positive electrode can provide a space for full expansion of the negative electrode silicon-doped active layer on the outer side surface of the negative electrode, and the concave parts 211 of the inner side surface of the positive electrode provide a clearance for the expansion of the outer side surface of the negative electrode so as not to affect the depth of the convex parts 210 of the positive electrode, and to ensure a normal support role of the convex parts 210 of the positive electrode.

An embodiment of the present application further provides a battery including the jelly roll as described above.

In summary, the embodiments of the present application provide a jelly roll and a battery, where the jelly roll includes a negative electrode sheet 100 and a positive electrode sheet 200, which are laminated, and the negative electrode sheet 100 and the positive electrode sheet 200 have opposite polarity; the negative electrode sheet 100 includes a negative electrode current collector 101, the negative electrode current collector 101 has a first surface 1011 and second surface 1012 opposite to the first surface 1011 along a first direction (z-axis shown in the figures), the first surface 1011 is provided with a first coating layer 102, and the second surface 1012 is provided with a second coating layer 103; the first coating layer 102 is provided with a plurality of grooves 110 extending along a second direction (y-axis shown in the figures), and the centers of two adjacent grooves 110 are spaced apart by a first distance S in a third direction; the positive electrode sheet 200 is provided with a plurality of convex parts 210 and concave parts 211 corresponding to the convex parts 210, and the grooves 110 and the convex parts 210 are provided opposite to each other; the size of vertical projections of the convex parts 210 on the electrode sheet is a first width R1, the first width R1 being greater than the first distance S.

The jelly roll provided by the embodiments of the present application increases the micro-spacing between the negative electrode sheet 100, the separator and the positive electrode sheet 200 by providing the convex parts 210 and the concave parts 211 corresponding to the convex parts 210 on the positive electrode 200, and the convex parts provide a support for contact with the separator, so that there is a certain support between the negative electrode sheet 100 and the positive electrode sheet 200, and these micro-spacings form a space that can accommodate the electrolyte, so that the electrolyte has a sufficient amount of infiltration on the electrode sheet, avoiding the occurrence of abnormal situations such as insufficient electrolyte between the electrode sheets and the separator caused by the interlayer extrusion of the electrode sheets, poor infiltration, or even lithium precipitation of the negative electrode sheet, and ensuring that the electrolyte has a sufficient amount of infiltration.

At the same time, the jelly roll is provided with the grooves 110, which is directly opposite to the convex parts 210, on the negative electrode sheet 100, to provide expansion space for the expansion of the negative electrode sheet, thereby mitigating an extrusion and deformation of the convex parts of the positive electrode or deformation of the grooves of the negative electrode caused by expansion of the negative electrode sheet during a process of hot-pressing formation or charging and discharging of the battery, and guaranteeing structural strength of the convex parts and the grooves, as well as an interface bonding strength between the electrode sheets and the separator, to stably play a support role for the separator, and at the same time, sufficient expansion space can also prevent the negative electrode sheet from extruding the separator during expansion and consequent deformation of the separator.

Further, when the convex parts 210 are directly facing the grooves 110, it is possible to prevent the convex parts 210 from being embedded in the grooves 110 of the negative electrode, facilitate a formation of a SEI film on the convex parts of the positive electrode, thereby forming an effective protection for the convex parts 210 of the positive electrode, and preventing decreased structural stability of active materials of the positive electrode and accelerated decay of battery capacity due to breakage of active particles of the convex parts 210 of the positive electrode or even cobalt precipitation.

The embodiments or examples in this specification are described in a progressive manner, with each embodiment focusing on the difference from the other embodiments, and the same and similar parts among various embodiments may refer to each other.

It should be noted that references in the specification to "an embodiment", "embodiments", "exemplary embodiments", "some embodiments" and the like indicate that the described embodiment(s) may include a particular feature, structure, or characteristic, but not every embodiment necessarily includes the particular feature, structure, or characteristic. Furthermore, such phrases may not necessarily refer to the same embodiment. Furthermore, in describing a particular feature, structure, or characteristic in conjunction with an embodiment, the realisation of such a feature, structure, or characteristic in conjunction with explicitly or not explicitly described other embodiments is within the scope of knowledge of a person skilled in the field.

In general, terms should be understood at least in part by their use in context. For example, depending at least in part on the context, the term "one or more" as used in the text may be used to describe any feature, structure, or characteristic in the singular sense, or may be used to describe a combination of features, structures, or characteristics in the plural sense. Similarly, depending at least in part on the context, terms such as "a" or "the" may also be understood as conveying singular usage or plural usage.

It should be readily understood that "on . . . ", "over . . . ", and "above . . . " in this disclosure should be construed in the broadest manner, so that "on . . . " not only indicates not only "directly on something" but also "on something" with an intervening feature or layer, and "over . . . " or "above . . . " not only includes the meaning of "over. something" or "above something", but also the meaning of "over something" or "above something" without an intervening feature or layer (i.e., directly on something).

In addition, the text may use spatially relative terms for ease of illustration, e.g., "below", "under", "down", "over", "above", etc., to describe the relationship of one element or feature in relative to other elements or features as shown in figures. The spatially relative terms are intended to encompass different orientations of the devices in use or operation other than the orientation shown in the accompanying drawings. The devices may have other orientations (rotated by 90 degrees or in other orientations) and the spatially relative terms used in the text may likewise be interpreted accordingly.

Finally, it should be noted that the above embodiments are only used to illustrate the technical solutions of the present application and not to limit them; although the present application is described in detail with reference to the foregoing embodiments, those skilled in the field should understand that it is still possible to modify the technical solutions recorded in the foregoing embodiments or to make equivalent substitutions for some or all of the technical features therein; and these modifications or substitutions do not take the essence of the corresponding technical solutions out of the scope of the technical solutions of the embodiments of the present application.

What is claimed is:

1. A jelly roll, comprising a straight section and corner sections located at two opposite ends of the straight section, and comprising:

a negative electrode sheet and a positive electrode sheet, both of which are laminated, wherein the negative electrode sheet comprises a negative electrode current collector, and the negative electrode current collector has a first surface and a second surface opposite to the first surface along a first direction, the first surface is provided with a first coating layer, and the second surface is provided with a second coating layer;

the first coating layer and the second coating layer are provided with a plurality of grooves, and centers of two most adjacent grooves are spaced apart by a first distance;

the positive electrode sheet is provided with a plurality of convex parts and concave parts corresponding to the convex parts, and a surface on which the convex parts of the positive electrode sheet are located and a surface on which the grooves of the negative electrode sheet are located are provided opposite to each other;

wherein the convex parts and the concave parts being provided corresponding to each other refers to that: vertical projections of the convex parts along the first direction and vertical projections of the concave parts along the first direction overlap;

along a width direction of the grooves, vertical projections of the convex parts of the positive electrode sheet onto the negative electrode sheet in a thickness direction of the negative electrode sheet have a size greater than the first distance;

wherein the size is a projection length along a length direction of the negative electrode sheet;

wherein the convex parts and the grooves are provided opposite to each other, and the concave parts and the grooves are provided opposite to each other;

wherein along the width direction of the grooves, a size of the vertical projections of the convex parts of the positive electrode sheet onto the negative electrode sheet in the thickness direction of the negative electrode sheet is R1, and the first distance is S, with R1/S=1.02~8;

wherein a groove width of the grooves is M, with R1/M=8~50; R1=0.3 mm~8 mm; M=30 μm~170 μm; S=0.5 mm~3 mm; and wherein the jelly roll further comprises an electrolyte doped with 1,4-dicyano-2-butene, and a content of the 1,4-dicyano-2-butene in the electrolyte is 0.05%~3%.

2. The jelly roll according to claim 1, wherein at least one of the first coating layer and second coating layer comprise at least one of a silicon-carbon composite material and a silicone-oxygen composite material, and mass proportion of at least one of the silicon-carbon composite material and silicone-oxygen composite material in the first coating layer and second coating layer is less than or equal to 50 wt %.

3. The jelly roll according to claim 1, wherein the positive electrode sheet comprises a positive electrode current collector, the positive electrode current collector has a third surface and a fourth surface, which are opposite to each other, along the first direction, the third surface is provided with a third coating layer and the fourth surface is provided with a fourth coating layer;

the negative electrode sheet and the positive electrode sheet are wound around a first central plane, a surface of the positive electrode current collector facing the first central plane is the third surface, and a surface of the positive electrode current collector away from the first central plane is the fourth surface, the third surface and the first surface are provided opposite to each other, and the fourth surface and the second surface are provided opposite to each other; and the convex parts are protruded from the third coating layer to the fourth coating layer.

4. The jelly roll according to claim 3, wherein a sum of vertically projected areas of the plurality of convex parts projected on the negative electrode sheet is 60%~90% of an area of the fourth coating layer.

5. The jelly roll according to claim 3, wherein a shape of the vertical projections of the convex parts in the thickness direction of the negative electrode sheet comprises a circle, a semicircle, an oval, a plum blossom shape, a polygonal shape, a diamond shape, a capsule shape, or an island shape.

6. The jelly roll according to claim 5, wherein the positive electrode sheet comprises an upper surface and a lower surface provided opposite to each other, and the convex parts are formed by protruding outward from the upper surface of the positive electrode sheet;

the convex parts each comprise a protruding part and a root part connecting the protruding part with the upper surface;

the protruding part is arc-shaped, and/or the protruding part is connected with the upper surface through an arc-shaped edge surface.

7. The jelly roll according to claim 6, wherein a line connecting the root part and a vertex of the protruding part is a first connecting line, an angle between the first connecting line and the upper surface is a first angle, and the first angle is 3°~45°.

8. The jelly roll according to claim 3, wherein the jelly roll has a first thickness H1 in the corner sections and the jelly roll has a second thickness H2 in the straight section, and the first thickness H1 and the second thickness H2 has a following relationship: H1/(H2/2)=1.05~1.5.

9. The jelly roll according to claim 6, wherein a center spacing of the vertical projections of two most adjacent convex parts in the thickness direction of the negative electrode sheet is D1=1 mm~6 mm; and the root part has a vertical distance from a vertex of the protruding part in the first direction, and the vertical distance is H3=3 μm~80 μm.

10. The jelly roll according to claim 9, wherein in the corner sections, the vertical distance from vertexes of the convex parts of an innermost circle of the jelly roll to the root parts of the convex parts is a first vertical distance, the vertical distance from vertexes of the convex parts of an outermost circle of the jelly roll to the root parts of the convex parts is a second vertical distance, and the first vertical distance is greater than the second vertical distance.

11. The jelly roll according to claim 1, wherein in the first direction, the grooves have a groove depth, the groove depth being T=10 μm~60 μm.

12. The jelly roll according to claim 1, wherein the vertical projection of each of the convex parts on the negative electrode sheet has a center point, part of the center points being distributed on a second connecting line;

vertical projections of the grooves on the negative electrode current collector are a rectangle, and the second connecting line is parallel to or intersects with the rectangle; and wherein the second connecting line is a line composed of at least two of the center points.

13. A battery, comprising the jelly roll according to claim 1.

14. The battery according to claim 13, wherein the first surface and the second surface of the negative electrode sheet are each provided with the plurality of grooves; and the convex parts and the grooves are provided opposite to each other, and the concave parts and the grooves are provided opposite to each other.

15. The battery according to claim 13, wherein along the width direction of the grooves, the size of the vertical projections of the convex parts of the positive electrode sheet onto the negative electrode sheet in the thickness direction of the negative electrode sheet is R1, and the first distance is S, with R1/S=1.02~8.

16. The battery according to claim 13, wherein along the width direction of the grooves, the size of the vertical projections of the convex parts of the positive electrode sheet onto the negative electrode sheet in the thickness direction of the negative electrode sheet is R1 and a groove width of the grooves is M, with R1M=8~50.

17. The battery according to claim 13, wherein at least one of the first coating layer and second coating layer comprise at least one of a silicon-carbon composite material and a silicone-oxygen composite material, and mass proportion of at least one of the silicon-carbon composite material and silicone-oxygen composite material in the first coating layer and second coating layer is less than or equal to 50 wt %.

* * * * *